(12) United States Patent
Namiki et al.

(10) Patent No.: US 11,174,897 B2
(45) Date of Patent: Nov. 16, 2021

(54) SENSOR ATTACHMENT MEMBER AND SENSOR ATTACHMENT METHOD FOR ROLLING GUIDE DEVICE

(71) Applicant: THK CO., LTD., Tokyo (JP)

(72) Inventors: Akihiko Namiki, Tokyo (JP); Masashi Sugiura, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 17/273,432

(22) PCT Filed: Oct. 2, 2019

(86) PCT No.: PCT/JP2019/038874
§ 371 (c)(1),
(2) Date: Mar. 4, 2021

(87) PCT Pub. No.: WO2020/080102
PCT Pub. Date: Apr. 23, 2020

(65) Prior Publication Data
US 2021/0246943 A1   Aug. 12, 2021

(30) Foreign Application Priority Data
Oct. 16, 2018 (JP) .............................. JP2018-194869

(51) Int. Cl.
*F16C 29/00* (2006.01)
*F16C 29/06* (2006.01)
(Continued)

(52) U.S. Cl.
CPC ...... *F16C 29/0609* (2013.01); *F16C 29/0647* (2013.01); *F16C 41/00* (2013.01);
(Continued)

(58) Field of Classification Search
CPC .. F16C 29/005; F16C 29/0647; F16C 29/069; F16C 41/007; F16C 2233/00;
(Continued)

(56) References Cited

U.S. PATENT DOCUMENTS 5,842,283 A * 12/1998 Yatsu ................. G01D 5/34753
33/706
D513,171 S * 12/2005 Richardson ................... D25/133
(Continued)

FOREIGN PATENT DOCUMENTS

CN 108167329 A * 6/2018
DE 102017206584 A1 * 10/2018 ............ F16C 41/007
(Continued)

OTHER PUBLICATIONS

Notification of Reasons for Refusal dated Feb. 12, 2020, issued in counterpart JP Patent Application No. 2018-194869, w/English translation (6 pages).
(Continued)

*Primary Examiner* — Marcus Charles
(74) *Attorney, Agent, or Firm* — Westerman, Hattori, Daniels & Adrian, LLP (57) ABSTRACT

Provided is a sensor mounting member and a sensor mounting method for easily fixing a sensor of a type among various types to a track rail of a rolling guide device in one operation. The sensor mounting member includes: a sensor holding portion configured to cover the sensor so as to hold the sensor between a top surface of the track rail and the sensor holding portion; and a pair of leg portions, which are formed at both ends of the sensor holding portion, respectively, and are configured to sandwich the track rail from both sides in a width direction of the track rail while being elastically deformed. Further, along with sandwiching of the track rail by the pair of leg portions, the sensor holding
(Continued)

portion presses the sensor onto the top surface of the track rail.

3 Claims, 4 Drawing Sheets

(51) Int. Cl.
| | | |
|---|---|---|
| F16C 41/00 | (2006.01) | |
| F24S 25/63 | (2018.01) | |
| F16C 43/00 | (2006.01) | |
| F24S 25/634 | (2018.01) | |
| F24S 25/60 | (2018.01) | |

(52) U.S. Cl.
CPC ............ *F16C 43/00* (2013.01); *F16C 29/005* (2013.01); *F16C 2233/00* (2013.01); *F24S 25/634* (2018.05); *F24S 2025/6004* (2018.05)

(58) Field of Classification Search
CPC ......... F16C 43/00; G01M 13/04; F24S 25/60; F24S 25/634; F24S 25/65; F24S 2025/6004; F24S 2025/60; F24S 2025/806
USPC ................ 384/13, 44, 59; D8/354, 394–395; D25/133
See application file for complete search history.

(56) References Cited

U.S. PATENT DOCUMENTS

| | | | | |
|---|---|---|---|---|
| 7,547,141 | B2 * | 6/2009 | Chen ..................... | F16C 29/00 |
| D690,583 | S * | 10/2013 | Sendra-Gonzalez .. | F16M 13/02 |
| | | | | D8/394 |
| 9,581,204 | B2 * | 2/2017 | Yoshida .............. | F16C 29/0602 |
| 9,863,478 | B2 * | 1/2018 | Sakagami ............. | F16C 29/086 |
| 10,125,801 | B2 * | 11/2018 | Wilson .................... | F16B 7/042 |
| 10,371,202 | B2 * | 8/2019 | Hoshide ............. | F16C 29/0647 |
| 10,712,236 | B2 | 7/2020 | Honjo et al. | |
| 2009/0205425 | A1 * | 8/2009 | Honjo ................. | G01M 13/045 |
| | | | | 73/593 |

FOREIGN PATENT DOCUMENTS

| | | | |
|---|---|---|---|
| JP | 8-270619 A | 10/1996 | |
| JP | 2008-57164 A | 3/2008 | |
| JP | 2009-92087 A | 4/2009 | |
| JP | 2009-210301 A | 9/2009 | |
| JP | 2018-84426 A | 5/2018 | |
| JP | 2018179283 A * | 11/2018 | ............ G01M 13/04 |
| WO | WO-2015033969 A1 * | 3/2015 | ............ F16C 29/005 |

OTHER PUBLICATIONS

Decision to Grant a Patent dated Jul. 8, 2020, issued in counterpart JP Patent Application No. 2018-194869, w/English translation (6 pages).

International Search Report dated Dec. 17, 2019, issued in counterpart International Application No. PCT/JP2019/038874 (2 pages).

* cited by examiner

SENSOR ATTACHMENT MEMBER AND SENSOR ATTACHMENT METHOD FOR ROLLING GUIDE DEVICE

CROSS-REFERENCE TO RELATED APPLICATION

The disclosure of Japanese Patent Application No. 2018-194869 filed on Oct. 16, 2018, including the specification, drawings and abstract is incorporated herein by reference in its entirety.

TECHNICAL FIELD

The present invention relates to a sensor mounting member and a sensor mounting method for mounting a sensor of a type among various types, such as an acceleration sensor, to a track rail. The sensor mounting member and the sensor mounting method are applied to a rolling guide device in which a moving block is assembled to a track rail through intermediation of a large number of rolling elements.

BACKGROUND ART

Hitherto, a rolling guide device of this type includes a track rail and a moving member. The track rail has a rolling surface for rolling elements, which extends along a longitudinal direction of the track rail. The moving member is assembled to the track rail through intermediation of a large number of rolling elements which roll on the rolling surface, and is reciprocable along the track rail. The moving member has a load rolling surface on which the rolling elements roll while bearing a load. The load rolling surface is opposed to the rolling surface of the track rail to define a load path for the rolling elements. Further, the moving member has no-load paths for allowing the rolling elements to circulate from one end to another end of the load path. The load path and the no-load paths are continuous with one another to define an endless circulation path for the rolling elements. With such a configuration, the moving member is movable along the track rail without being limited in stroke thereof.

A product lifetime of the rolling guide device mainly depends on fatigue in the rolling surface of the track rail or the load rolling surface of the moving member. However, when the rolling surface and the load rolling surface as well as the rolling elements such as balls or rollers which roll thereon are not appropriately lubricated with lubricant or bear excessive loads, flaking of the rolling surface or the load rolling surface may occur early, with the result that the product lifetime of the rolling guide device is shortened. Further, the rolling guide device is applicable to various uses, and the progress of fatigue in the rolling surface or the like is inevitably affected by, for example, a use environment and an applied load depending on the use (hereinafter referred to as "use condition"), such as an environment in which special foreign matters fall onto the track rail or a use under an environment of an extremely high or low temperature.

Thus, in order to allow the rolling guide device to exert its original performance and fulfill its product lifetime, it is desired that an operation condition of the rolling guide device be continuously detected by various sensors, to thereby allow recognition of the state of the rolling guide device, which is varied from hour to hour, based on the detected contents.

For example, for a rolling device as described in Patent Literature 1, the following diagnosis system is proposed. Specifically, an acceleration sensor is mounted to the track rail or the moving member, and an output signal from the acceleration sensor is analyzed. Then, a result of the analysis is compared with predetermined reference data to determine whether the rotary bearing has an abnormality.

In general, as a method of fixing the acceleration sensor to an object to be measured, such as the moving member or the track rail, there are known a method of directly fixing the acceleration sensor to the object to be measured with a screw through use of a female thread formed in the acceleration sensor, a method of bonding the acceleration sensor to the object to be measured with an adhesive, and a method of fixing the acceleration sensor to the object to be measured by a magnetic force through use of a magnet when the object to be measured is a magnetic body. Even in Patent Literature 1, the acceleration sensor is fixed to the track rail by those methods.

CITATION LIST

Patent Literature

[PTL 1] JP 2009-210301 A

DISCLOSURE OF THE INVENTION

Problems to be Solved by Invention

However, when the sensor of a type among various types is fixed to the track rail of the rolling guide device, in the screw fixation method described above, it is required to form a screw hole in the track rail, and it is required to form the screw hole at the time of production of the track rail. Thus, there is a problem in that an increase in production cost is brought about. Further, there is another problem in that the screw fixation method is not applicable to the track rail of the existing rolling guide device that has already been used.

Further, in the case of fixing with the adhesive, there is a problem in that it is difficult to remove the sensor from the track rail, and that the sensor hinders and disables the moving member from being pulled out of the track rail. Moreover, in the case of fixing through use of the magnet, when the magnetic force of the magnet is insufficient, there is a risk in that the sensor is misaligned from the fixed position during use of the sensor. Meanwhile, when the magnetic force of the magnet is excessively strong, similarly to the case of fixing with the adhesive, there is a problem in that it is difficult to remove the sensor from the track rail.

Means for Solving the Problems

The present invention has been made in view of the above-mentioned problems, and therefore has an object to provide a sensor mounting member and a sensor mounting method, which are capable of easily mounting a sensor of a type among various types to a track rail of a rolling guide device in one operation, are capable of easily removing the sensor mounted to the track rail, and require no additional work to be performed on the track rail.

That is, the present invention relates to a sensor mounting member configured to fix a sensor of a type among various types to a track rail of a rolling guide device, the sensor mounting member including: a sensor holding portion configured to cover the sensor so as to hold the sensor between a top surface of the track rail and the sensor holding portion; and a pair of leg portions, which are formed at both ends of the sensor holding portion, respectively, and are configured to sandwich the track rail from both sides in a width direction of the track rail while being elastically deformed. Further, along with sandwiching of the track rail by the pair of leg portions, the sensor holding portion presses the sensor onto the top surface of the track rail.

Further, a sensor mounting method according to the present invention includes: placing the sensor on a top surface of the track rail; covering the sensor with a sensor mounting member; and pressing the sensor mounting member toward the track rail so that a pair of leg portions of the sensor holding portion are spread out while being elastically deformed so as to sandwich the track rail from both sides in a width direction of the track rail, and through use of a force of bringing the pair of leg portions into press contact with both side surfaces of the track rail, the sensor mounting member holds the sensor between the top surface of the track rail and the sensor mounting member.

Effects of the Invention

According to the sensor mounting member of the present invention, by the elastic forces exerted by the pair of leg portions, the sensor of a type among various types is mounted to the track rail of the rolling guide device. Thus, through use of the sensor mounting member, the sensor of a type among various types can easily be mounted to the track rail in one operation, and the sensor fixed to the track rail can easily be removed. Further, in order to mount the sensor mounting member to the track rail, there is no need to perform additional work on the track rail. Thus, the sensor mounting member is also applicable to the track rail of the existing rolling guide device that has already been used.

MODE FOR CARRYING OUT THE INVENTION

Now, detailed description is made of a sensor mounting member for a rolling guide device according to one embodiment of the present invention with reference to the accompanying drawings.

Figure 1:
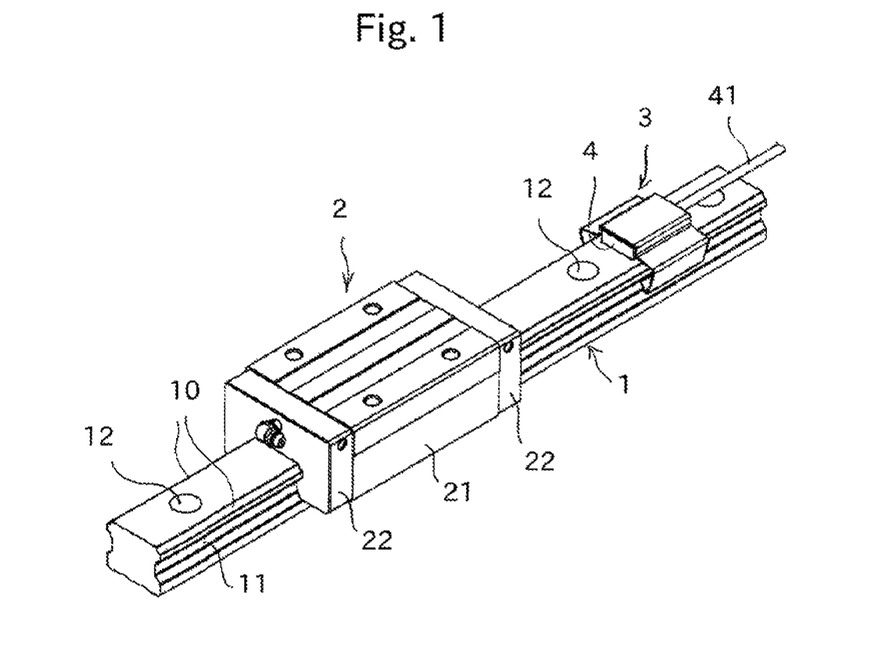
FIG. 1 is a perspective view for illustrating an example of a rolling guide device to which a sensor mounting member according to the present invention is mounted.

FIG. 1 is a perspective view for illustrating an example of a rolling guide device to which the sensor mounting member according to the present invention is mountable. The rolling guide device includes a track rail 1 and a moving member 2. The track rail 1 extends linearly. The moving member 2 is assembled to the track rail 1 through intermediation of a large number of balls being rolling elements. The track rail 1 is laid on a fixed portion of various machine tools, and a movable body of a type among various types is mounted to the moving member 2, thereby being capable of guiding the movable body along the track rail 1 in a freely reciprocable manner.

The track rail 1 is formed into an elongated body having a substantially quadrangular cross section. The track rail 1 includes a plurality of rolling surfaces 10 for the balls, which are formed along a longitudinal direction of the track rail 1. A recess 11 is formed in each of right and left side surfaces of the track rail 1. As a result, a pair of projections are formed on upper portions of both side surfaces of the track rail 1 along the longitudinal direction, respectively. Two rolling surfaces 10 for the balls are formed so as to sandwich each of the projections from upper and lower sides of each of the projections, that is, four rolling surfaces 10 are formed in total. Further, the track rail 1 has a plurality of bolt mounting holes 12, which are formed at predetermined intervals in the longitudinal direction and each pass through the track rail 1 from an upper surface to a bottom surface of the track rail 1. Through use of fixing bolts inserted in the bolt mounting holes 12, the track rail 1 can be firmly fixed to the fixed portion.

Meanwhile, the moving member 2 mainly includes a main body member 21 made of metal, and a pair of covers 22 made of synthetic resin. The pair of covers 22 are mounted to both ends of the main body member 21 in a moving direction of the main body member 21. The moving member 2 has a plurality of endless circulation paths for the balls so as to correspond to the rolling surfaces 10 of the track rail 1. The main body member 21 forming the moving member 2 includes load rolling surfaces arranged to be opposed to the rolling surfaces 10 of the track rail 1, and the balls roll between the rolling surfaces 10 of the track rail 1 and the load rolling surfaces of the main body member 21 while bearing a load. Further, the main body member 21 includes return paths for the balls, which are formed in parallel to the load rolling surfaces. The balls roll in the return paths without bearing a load.

Meanwhile, each of the pair of covers 22 includes a direction change path and a scooping portion. The direction change path is configured to connect the load rolling surface and the return path to each other. The scooping portion is configured to guide the balls rolling on the rolling surface 10 of the track rail into the direction change path. Accordingly, when the cover 22 is fixed to an end surface of the main body member 21, the balls having rolled on the rolling surface 10 of the track rail 1 while bearing a load are moved away from the rolling surface 10 by the scooping portion, guided into the direction change path, and fed into the return path through the direction change path. Further, the balls having rolled in the return path are returned onto the rolling surface 10 of the track rail 1 through the direction change path. That is, when the pair of covers 22 are fixed to the main body member 21, the endless circulation paths for the balls are brought to completion.

The rolling guide device in the embodiment described with reference to the drawings is merely an example to which a sensor mounting member according to the present invention is applicable, and the shape of the track rail 1 is not limited thereto. Further, in the rolling guide device described with reference to the drawings, the balls are used as the rolling elements. However, the present invention is also applicable to a rolling guide device using rollers.

Next, description is made of an example of the sensor mounting member according to the embodiment to which the present invention is applied.

As illustrated in FIG. 1, a sensor 4 is fixed to an end portion of the track rail 1 in a longitudinal direction thereof through use of a sensor mounting member 3. The sensor 4 is configured to detect a change in physical quantity caused when the moving member 2 and the track rail 1 move relative to each other. Through analysis of a detection signal of the sensor 4, a change in state caused by long-term usage of the rolling guide device can be diagnosed.

When vibration generated in the track rail 1 is chosen as a physical quantity to be detected by the sensor 4, for example, an acceleration sensor can be used as the sensor 4. Further, when a change in sound generated when the moving member 2 moves along the track rail 1 is chosen as a physical quantity to be detected by the sensor 4, a microphone can be used as the sensor 4.

Figure 2:
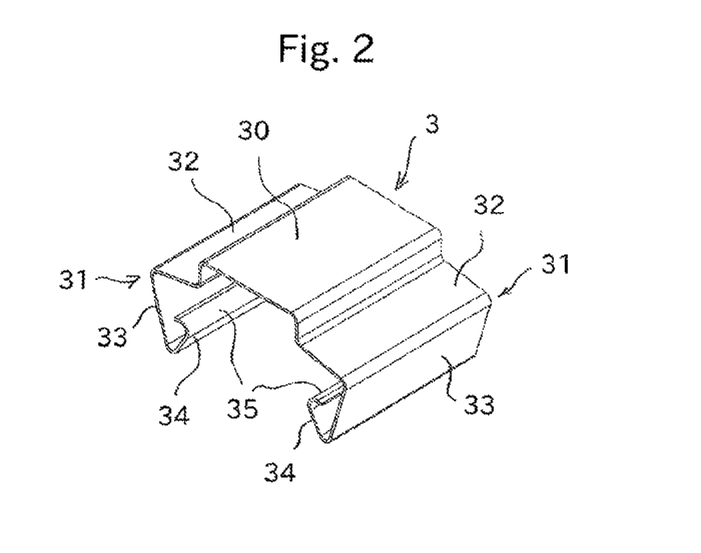
FIG. 2 is a perspective view for illustrating an example of the sensor mounting member according to an embodiment of the present invention.
Figure 3:
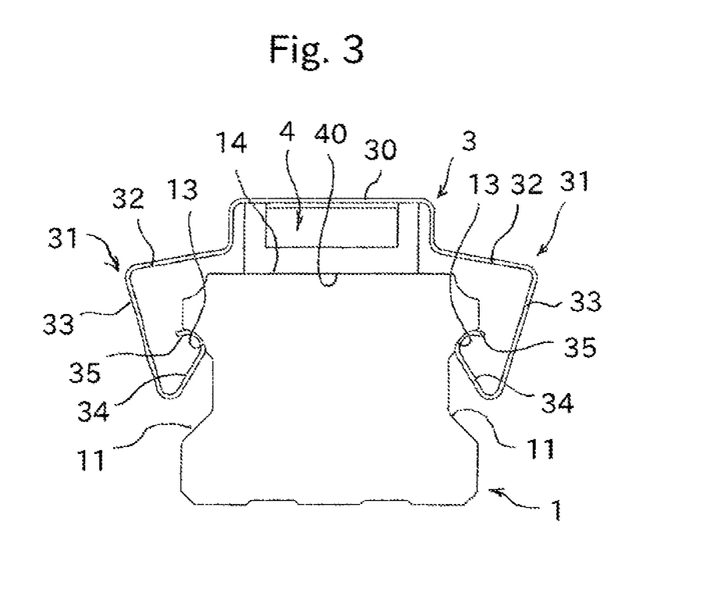
FIG. 3 is a front view for illustrating a state in which the sensor mounting member according to the embodiment is mounted to a track rail.

FIG. 2 is a perspective view for illustrating the sensor mounting member 3. FIG. 3 is a front view for illustrating a state in which the sensor mounting member 3 is mounted to the track rail 1. The sensor 4 to be used in this embodiment is an acceleration sensor. As illustrated in FIG. 3, the sensor 4 is formed into a substantially rectangular shape, and is used with a detection surface 40 being pressed on a top surface of the track rail 1. Further, a cable 41 configured to connect the sensor 4 to another measurement device extends from the sensor 4 (see FIG. 1).

The sensor mounting member 3 is manufactured by bending a metal plate made of, for example, stainless steel, and can be mounted to the track rail 1 without use of a tool. The sensor mounting member 3 includes a sensor holding portion 30 and a pair of leg portions 31. The sensor holding portion 30 is configured to hold the sensor 4 between the top surface of the track rail and the sensor holding portion 30. The pair of leg portions 31 are formed at both ends of the sensor holding portion 30, respectively, and extend downward along both side surfaces of the track rail 1, respectively.

When the sensor mounting member 3 is used, the sensor mounting member 3 is pushed onto the track rail from above the track rail 1 (from an upper side of the drawing sheet of FIG. 3). That is, after the sensor 4 is placed on the track rail 1, the sensor 4 is covered with the sensor mounting member 3, and the sensor mounting member is pressed toward the track rail. Thus, the pair of leg portions 31 are spread out while being elastically deformed, thereby sandwiching the track rail 1 from both sides in a width direction of the track rail 1. In this manner, mounting of the sensor mounting member 3 to the track rail 1 is completed.

The sensor holding portion 30 has a groove configured to receive a part of the sensor 4, and covers the sensor 4 from above the track rail 1 (from the upper side of the drawing sheet of FIG. 3). Under a state in which the sensor mounting member 3 is mounted to the track rail 1, the sensor 4 is held between the sensor holding portion 30 and a top surface 14 of the track rail 1. Further, each of the pair of leg portions 31 is held in abutment against the side surface of the track rail 1 while being elastically deformed, and the track rail 1 is sandwiched by the pair of leg portions 31 from the both sides in the width direction. The pair of leg portions 31 elastically sandwich the track rail 1, and thus the sensor holding portion 30 is pulled downward toward the top surface of the track rail 1. In this manner, the sensor 4 is pressed by the sensor holding portion 30 onto the top surface of the track rail 1, and is fixed to the track rail 1 by a frictional force generated between the detection surface 40 and the track rail 1.

Each of the pair of leg portions 31 includes a support piece 32 and a grasping piece 33. The support piece 32 extends from the sensor holding portion 30 toward an outer side in the width direction of the track rail 1. The grasping piece 33 extends downward from the support piece 32 so as to overlap the side surface of the track rail 1. That is, each of the leg portions 31 is cantilevered from the sensor holding portion 30. When the sensor mounting member 3 is mounted to the track rail 1 while lower ends of the pair of leg portions 31 are pushed so as to be spread out, the support pieces 32 are elastically deformed with respect to the sensor holding portion 30, and the grasping pieces 33 are elastically deformed with respect to the support pieces 32. Thus, the sensor mounting member 3 holds the track rail 1 between the pair of leg portions 31.

Further, a guide piece 34 is formed at the lower end and on an inner side of the grasping piece 33 so as to face the track rail 1, and an abutment portion 35 configured to press the track rail 1 is formed at an end of the guide piece 34. The guide piece 34 is formed by folding the lower end of the grasping piece 33 in a V shape toward the track rail 1, and the abutment portion 35 is formed by curving an upper end of the guide piece 34 in an arc shape. A downward inclined surface 13 defining the recess 11 is formed on the side surface of the track rail 1, and the abutment portion 35 is brought into press contact with the downward inclined surface 13 of the track rail 1. In the track rail 1 in this embodiment, the rolling surface 10 for the balls is formed on the downward inclined surface 13. As a result, the abutment portion 35 is brought into press contact with the rolling surface 10.

Figure 4:
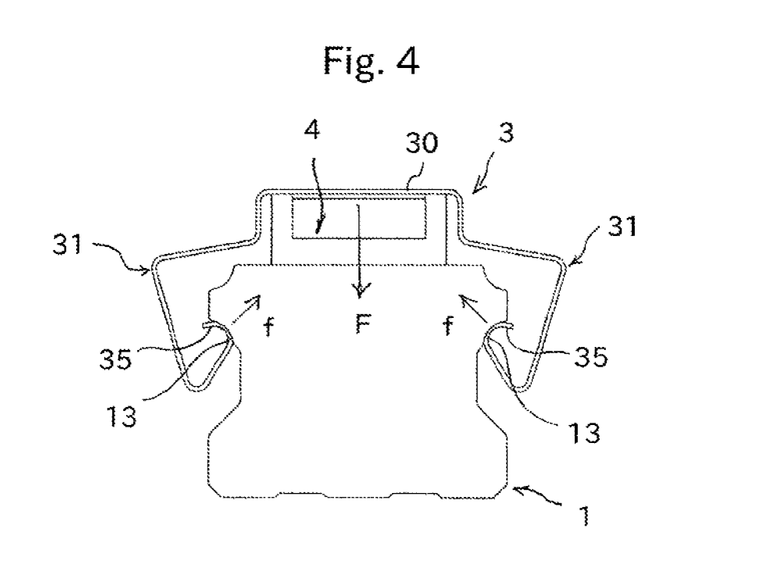
FIG. 4 is an explanatory view for illustrating forces to be applied to the track rail by the sensor mounting member according to the embodiment.

The sensor mounting member 3 is mounted to the track rail 1 under a state in which the pair of leg portions 31 are pushed so as to be spread out, and the abutment portion 35 formed on each of the leg portions 31 is brought into press contact with the downward inclined surface 13 of the track rail 1. Accordingly, as illustrated in FIG. 4, each abutment portion 35 applies an obliquely upward force "f" to the track rail 1. Thus, as a reaction force against the forces of pressing the track rail 1 by the abutment portions 35, a force F of pushing the sensor holding portion 30 downward toward the top surface 14 of the track rail 1 is applied to the sensor mounting member 3. The force F causes the sensor 4 to be pressed onto the track rail 1. Further, a frictional force equivalent to the magnitude of the force F is generated between the detection surface 40 of the sensor and the top surface 14 of the track rail 1. The frictional force causes the sensor 4 to be fixed to the top surface 14 of the track rail 1 without slipping.

Figure 5:
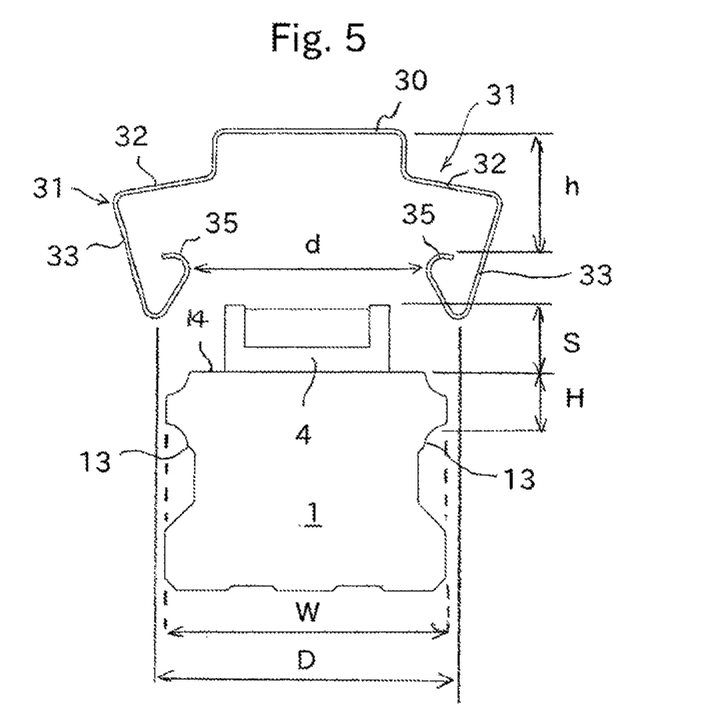
FIG. 5 is an explanatory view for illustrating a dimensional relationship between the sensor mounting member according to the embodiment and the track rail.

As illustrated in FIG. 5, when "h" represents a distance between the sensor holding portion 30 and the abutment portion 35 of the leg portion 31 in a height direction of the track rail 1 (up-and-down direction of the drawing sheet of FIG. 5), H represents a height of the top surface of the track rail 1 from a position of the downward inclined surface 13 of the track rail 1 pressed by the abutment portion 35, and S represents a height of the sensor 4 fixed to the top surface 14 of the track rail 1, it is required that a relation of $H+S>h$ be satisfied as a condition where the sensor holding portion 30 reliably presses the sensor onto the top surface 14 of the track rail 1.

When this condition is satisfied, the support piece 32 and the grasping piece 33 of each of the leg portions 31, which meet to form a substantially L shape, are spread out in the height direction of the track rail 1, and thus the abutment portion 35 is brought into abutment against the downward inclined surface 13 formed on the side surface of the track rail 1. Accordingly, each abutment portion 35 applies the obliquely upward force "f" (see FIG. 4) to the track rail 1, thereby generating the force F of pressing the sensor 4 onto the top surface 14 of the track rail 1 by the sensor holding portion 30.

Further, a distance D between a lowermost end of the grasping piece 33 of one of the leg portions 31 and a lowermost end of the grasping piece 33 of another one of the leg portions 31 is set larger than a width W of the track rail 1. Moreover, a distance "d" between the abutment portion 35 of one of the leg portions 31 and the abutment portion 35 of another one of the leg portions 31 is set smaller than the width W of the track rail 1.

Figure 6:
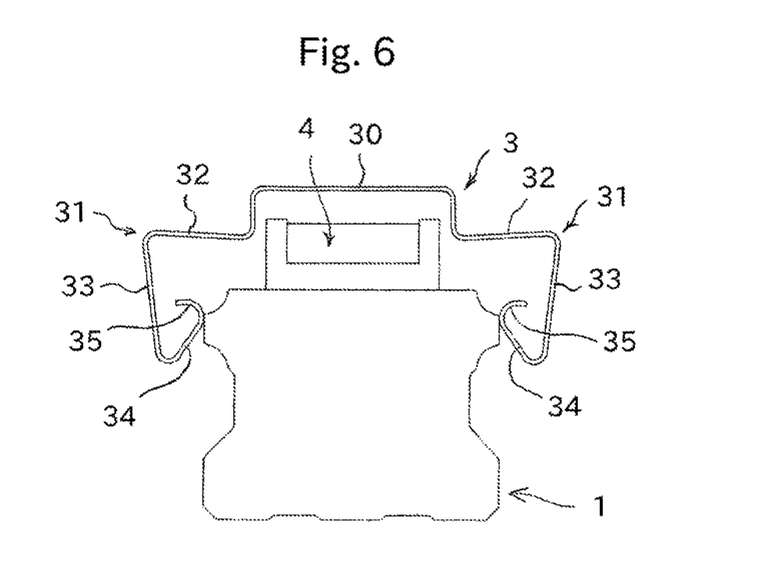
FIG. 6 is a front view for illustrating a state in which the sensor mounting member according to the embodiment is mounted to the track rail.

Therefore, when the sensor 4 is covered with the sensor mounting member 3 from above the track rail 1 and then the sensor mounting member 3 is pressed toward the track rail 1, the guide pieces 34 come into contact with vicinities of shoulder portions of the track rail 1 on the both sides in the width direction. Each of the guide pieces 34 is folded to extend obliquely upward from the lowermost end of the grasping piece 33. With this configuration, when the sensor mounting member 3 is further pressed toward the track rail 1, as illustrated in FIG. 6, while the guide pieces 34 slide on the track rail 1, the pair of leg portions 31 are spread out so as to be moved away from the side surfaces of the track rail 1. Finally, as illustrated in FIG. 3, the abutment portions 35 are fitted into the recesses of the track rail 1, and the abutment portions 35 are brought into press contact with the downward inclined surfaces 13 of the track rail 1.

That is, without use of a special tool, the sensor mounting member 3 according to this embodiment can easily be mounted to the track rail 1 by only being merely pressed from above the track rail 1. Further, when the sensor mounting member 3 is mounted, by pressing forces of the pair of leg portions 31 applied to the track rail 1, the sensor mounting member 3 can bring the sensor 4 into press contact with the track rail 1, and can firmly fix the sensor 4 to the track rail 1. Moreover, the sensor mounting member 3 is mounted to the track rail 1 by only elastic forces exerted by the pair of leg portions 31. Accordingly, the sensor mounting member 3 can easily be removed from the track rail 1 by merely pushing and spreading out the pair of leg portions 31.

Figure 7:
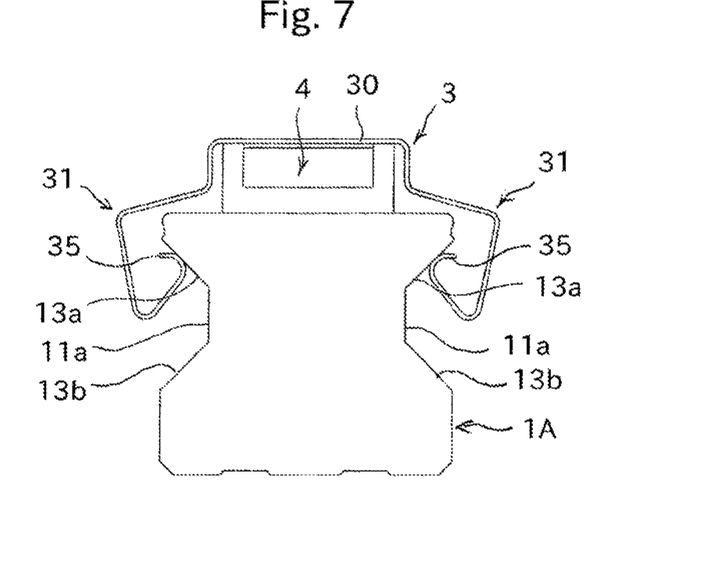
FIG. 7 is a front view for illustrating a state in which the sensor mounting member according to the embodiment is mounted to another track rail having a shape different from that of the track rail illustrated in FIG. 2.

FIG. 7 is a front view for illustrating a state in which the sensor mounting member 3 is mounted to a track rail 1A of another rolling guide device. The track rail 1A is suited to the rolling guide device using rollers as the rolling elements. A recess 11*a* is formed in each side surface of the track rail 1A, and a downward inclined surface 13*a* and an upward inclined surface 13*b* are formed on an upper portion and a lower portion of the recess 11*a*, respectively. The downward inclined surface 13*a* and the upward inclined surface 13*b* serve as rolling surfaces for the rollers. In the sensor mounting member 3, the abutment portions 35 of the leg portions 31 are brought into press contact with the downward inclined surfaces 13*a* so that the pair of leg portions 31 hold an upper structure of the track rail 1A. With this configuration, the sensor mounting member 3 according to the embodiment is flexibly applicable to track rails having different shapes, and hence can be used to fix the sensor to a track rail of various rolling guide devices.

In the sensor mounting member 3 according to the embodiment described above, the sensor holding portion 30 and the pair of leg portions are formed integrally with each other by bending a single metal plate. However, the sensor mounting member according to the present invention is not limited thereto. For example, the sensor holding portion and the pair of leg portions may be formed separately, and then integrated with each other by, for example, welding or screw fixation.

The invention claimed is:

1. A sensor mounting member configured to fix a sensor to a track rail of a rolling guide device, the sensor mounting member comprising:
   a sensor holding portion configured to cover the sensor so as to hold the sensor between a top surface of the track rail and the sensor holding portion;
   a pair of leg portions, which are formed at both ends of the sensor holding portion, respectively, and extend downward along both side surfaces of the track rail, respectively; and
   a pair of abutment portions, each of which is formed on an inner side of each of the leg portions so as to face the track rail, and is brought into press contact with a downward inclined surface formed on the side surface of the track rail along with elastic deformation of each of the leg portions,
   wherein under a state in which the sensor mounting member is unmounted to the track rail, a distance between the pair of abutment portions is set smaller than a width of the track rail,
   wherein under a state in which the sensor mounting member is mounted to the track rail while the pair of abutment portions are pushed so as to be spread out, and then each of the pair of abutment portions is held in press contact with the downward inclined surface of the track rail, along with elastic deformation of the pair of leg portions, the sensor holding portion presses the sensor onto the top surface of the track rail,
   wherein the leg portions each include:
   a support piece extending from the sensor holding portion toward an outer side in a width direction of the track rail; and
   a grasping piece extending downward from the support piece so as to overlap the side surface of the track rail, and including the abutment portion formed on the inner side of each of the leg portions so as to face the track rail, and
   wherein under a state in which each of the pair of abutment portions is held in press contact with the downward inclined surface of the track rail, the support piece is elastically deformed with respect to the sensor holding portion, and the grasping piece is elastically deformed with respect to the support piece so that the sensor holding portion presses the sensor onto the track rail.

2. The sensor mounting member according to claim 1, wherein the grasping piece has a guide piece formed at a lower end thereof by folding the lower end of the grasping piece and formed on the inner side of each of the leg portions so as to face the track rail, and each of the abutment portions is formed at an end of the guide piece, and
   wherein a distance between a lowermost end of the grasping piece of one of the leg portions and a lowermost end of the grasping piece of another one of the leg portions is larger than the width of the track rail.

3. The sensor mounting member according to claim 1, wherein a relation of H+S>h is satisfied,
   where "h" represents a distance between the sensor holding portion and the abutment portion of each of the leg portions in a height direction of the track rail, H represents a height of the top surface of the track rail from a position of the downward inclined surface of the track rail pressed by the abutment portion, and S represents a height of the sensor fixed to the top surface of the track rail.

\* \* \* \* \*